United States Patent
Doo et al.

(10) Patent No.: US 11,770,341 B2
(45) Date of Patent: Sep. 26, 2023

(54) BANDWIDTH ALLOCATING APPARATUS AND METHOD FOR PROVIDING LOW-LATENCY FRONTHAUL SERVICE IN PASSIVE OPTICAL NETWORK

(71) Applicant: ELECTRONICS AND TELECOMMUNICATIONS RESEARCH INSTITUTE, Daejeon (KR)

(72) Inventors: Kyeong Hwan Doo, Daejeon (KR); Kwang Ok Kim, Jeonju-si (KR); Han Hyub Lee, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/865,572

(22) Filed: Jul. 15, 2022

(65) Prior Publication Data
US 2023/0164083 A1    May 25, 2023

(30) Foreign Application Priority Data
Nov. 23, 2021 (KR) .................. 10-2021-0161899

(51) Int. Cl.
*H04L 47/2491* (2022.01)
*H04W 28/02* (2009.01)
(Continued)

(52) U.S. Cl.
CPC ........ *H04L 47/2491* (2013.01); *H04L 47/115* (2013.01); *H04L 47/20* (2013.01);
(Continued)

(58) Field of Classification Search
CPC ... H04W 28/20; H04W 72/12; H04W 72/569; H04Q 11/0067; H04Q 11/0064
See application file for complete search history.

(56) References Cited

U.S. PATENT DOCUMENTS

| | | |
|---|---|---|
| 9,392,617 B2 | 7/2016 | Lee et al. |
| 9,525,541 B2 | 12/2016 | Feng |
| (Continued) | | |

FOREIGN PATENT DOCUMENTS

| | | | | |
|---|---|---|---|---|
| CN | 101466052 A | * | 6/2009 | .......... H04J 14/0226 |
| JP | 2006109500 A | * | 4/2006 | ............ H04J 3/0682 |
| (Continued) | | | | |

*Primary Examiner* — Tom Y Chang
(74) *Attorney, Agent, or Firm* — LRK PATENT LAW FIRM

(57) ABSTRACT

Provided are an apparatus and a method for allocating a bandwidth for providing a low-latency fronthaul service in a passive optical network. An bandwidth allocating method performed by a bandwidth allocating apparatus included in an OLT includes receiving an actual report message requesting bandwidth allocation from at least one ONU for wired subscribers connected to the OLT, receiving radio scheduling information for at least one ONU for mobile connected to the OLT from a central unit (CU)/digital unit (DU), generating a virtual report message using the radio scheduling information received from the CU/DU, allocating a transmission bandwidth for the at least one ONU for wired subscribers and the at least one ONU for mobile through the received actual report message and the generated virtual report message, and transmitting the allocated transmission bandwidth to the ONU for wired subscribers and the ONU for mobile using a grant message.

14 Claims, 6 Drawing Sheets

(51) Int. Cl.
  *H04L 47/20* (2022.01)
  *H04W 28/20* (2009.01)
  *H04L 47/11* (2022.01)
  *H04W 72/543* (2023.01)
  *H04W 28/08* (2023.01)

(52) U.S. Cl.
  CPC ....... *H04W 28/0278* (2013.01); *H04W 28/20* (2013.01); *H04W 72/543* (2023.01); *H04W 28/0983* (2020.05)

(56) References Cited

U.S. PATENT DOCUMENTS

| | | |
|---|---|---|
| 10,420,085 B2 | 9/2019 | Andreoli-Fang |
| 10,827,240 B2 | 11/2020 | Chung et al. |
| 2013/0039182 A1* | 2/2013 | Das ................... H04Q 11/0067 370/235 |
| 2021/0136790 A1* | 5/2021 | Bidkar ................ H04W 88/085 |

FOREIGN PATENT DOCUMENTS

| | | |
|---|---|---|
| JP | 2011-146780 A | 7/2011 |
| KR | 10-2019-0045929 A | 5/2019 |
| KR | 10-2019-0097268 A | 8/2019 |

\* cited by examiner

BANDWIDTH ALLOCATING APPARATUS AND METHOD FOR PROVIDING LOW-LATENCY FRONTHAUL SERVICE IN PASSIVE OPTICAL NETWORK

CROSS-REFERENCE TO RELATED APPLICATION

This application claims the benefit of Korean Patent Application No. 10-2021-0161899 filed on Nov. 23, 2021, in the Korean Intellectual Property Office, the entire disclosure of which is incorporated herein by reference for all purposes.

BACKGROUND

1. Field of the Invention

One or more example embodiments relates to a bandwidth allocating apparatus and method for providing a low-latency fronthaul service in a passive optical network (PON), and more specifically, relates to a bandwidth allocating method to provide the low-latency fronthaul service in the PON using a time division multiplexing (TDM) scheme.

2. Description of Related Art

The PON is referred to the network from a central office configured as a 1:N structure in which at least one optical network unit (ONU) is connected to one optical line terminal (OLT) to a subscriber section. The PON was established to provide high-speed internet service to each home, apartment, and building, but it is gradually expanding its scope of application to the backhaul/fronthaul network of base stations based on price competitiveness.

First, a dynamic bandwidth allocation (DBA) of a status-report (SR) scheme may be used in the PON. In the DBA of the SR scheme, when data is transmitted from the user terminal for an arbitrary time, the ONU may temporarily store the received data in a buffer. Thereafter, when the ONU requests a transmission bandwidth to transmit the data temporarily stored in the buffer to the OLT (e.g., status-report), the OLT allocates the transmission bandwidth, and the ONU transmits data to the OLT using the allocated transmission bandwidth.

Although the PON of the TDM scheme has an advantage of high network utilization efficiency, there is an issue in that delay may increase. Although the application service so far does not have an issue in service since the latency tolerance is large, it is necessary to shorten the latency in the PON in order to accommodate backhaul/fronthaul and the like.

In order to reduce the latency in the PON, data queuing time (e.g., buffering time) in the ONU should be minimized. To this end, the OLT may know in advance when data arrives at the ONU, and allocate the transmission bandwidth to the corresponding ONU accordingly, thereby significantly shortening the ONU's buffering time and thus the PON's latency.

As such, cooperative dynamic bandwidth allocation (Co-DBA) may be used as a method for reducing the latency of the PON. The Co-DBA provides radio scheduling information to the OLT through cooperation between CU (central unit)/DU (Digital unit) wireless equipment and the OLT, and the OLT is the scheme that uses the radio scheduling information to allocate the transmission bandwidth to the ONU.

More specifically, since the CU/DU manages radio period transmission scheduling of a radio user equipment (UE) connected to a radio unit (RU), the RU knows the time and data amount to be transmitted to the CU/DU. Therefore, when the OLT uses the scheduling information received from the CU/DU, the OLT may allocate the transmission bandwidth to the ONU according to the data time and data amount input from the RU to the ONU, so that the latency may be reduced.

When the OLT manages only one ONU, it may be very simple to allocate the transmission bandwidth according to the expected arrival time. However, since the OLT manages many ONUs at the same time, an efficient method suitable for this is required to ensure the transmission rate and latency of all ONUs.

SUMMARY

Example embodiments provide a bandwidth allocating apparatus and method for providing a low latency fronthaul service in the PON, and more specifically, provide an apparatus and method for reducing an uplink transmission time through a method for allocating a transmission bandwidth with a high-speed by cycle by using radio scheduling information between CU/DU wireless equipment and an OLT.

According to an aspect, there is provided a bandwidth allocating method performed by a bandwidth allocating apparatus included in the OLT including receiving an actual report message requesting bandwidth allocation from at least one ONU for wired subscribers connected to the OLT, receiving radio scheduling information for at least one ONU for mobile connected to the OLT from the CU/DU, generating a virtual report message using the radio scheduling information received from the CU/DU, allocating a transmission bandwidth for the at least one ONU for the wired subscribers and the at least one ONU for the mobile through the received actual report message and the generated virtual report message, and transmitting the allocated transmission bandwidth to the at least one ONU for the wired subscribers and the at least one ONU for the mobile using a grant message.

The radio scheduling information may be received through a cooperative transport interface (CTI) report message including radio slot information of the RU.

The radio scheduling information may include at least one information of a base time representing a start time of a radio slot, a start-time-offset at which symbol data is started to be output based on the base time during a radio slot period, an end-time-offset at which a last symbol data is output during the radio slot period, a symbol end-time offset for knowing an end time of a symbol group in which at least one or more symbol data is grouped, and data size information of the symbol group.

A generation time of the virtual report message may be determined based on an expected time when a mobile packet of the RU temporarily stored in a buffer of the ONU is received by the OLT.

The generating of the virtual report message may include, when (i) T_ready representing a time available for transmission to the OLT after a packet corresponding to a symbol group arrives at the ONU is less than or equal to (ii) T_min representing a shortest time until a packet is outputted as the radio scheduling information is received and the grant message is received by the ONU, generating the virtual report message in a report update operation of a current cycle.

The T_ready may be determined by using a base time, a symbol end time offset, and a time taken for a mobile packet output from the RU to be ready for transmission in the ONU.

The T_min may be determined by using a time when a virtual report is able to be generated (T_ref) with respect to a time when the radio scheduling information arrives at the OLT (T_rx), a DBA cycle, a transmission time between the OLT and the ONU, and a processing time of the ONU.

The generating of the virtual report message may include, when (i) T_ready representing a time available for transmission to the OLT after a packet corresponding to a symbol group arrives at the ONU is greater than (ii) T_min representing a shortest time until a packet is outputted as the radio scheduling information is received and the grant message is received by the ONU, determining whether to generate a virtual report message after re-calculating T_ref in a next cycle.

According to another aspect, there is provided a bandwidth allocating apparatus included in an OLT including a processor, the processor is configured to receive an actual report message requesting bandwidth allocation from at least one ONU for wired subscribers connected to the OLT, receive radio scheduling information for at least one ONU for mobile connected to the OLT from a CU/DU, generate a virtual report message using the radio scheduling information received from the CU/DU, allocate a transmission bandwidth for the at least one ONU for the wired subscribers and the at least one ONU for the mobile through the received actual report message and the generated virtual report message and transmit the allocated transmission bandwidth to the at least one ONU for the wired subscribers and the at least one ONU for the mobile using a grant message.

The radio scheduling information may be received through the CTI report message including radio slot information of the RU.

The radio scheduling information may include at least one information of a base time representing a start time of a radio slot, a start time offset at which symbol data is started to be output based on the base time during a radio slot period, an end-time-offset at which a last symbol data is output during the radio slot period, a symbol end-time offset for knowing an end time of a symbol group in which at least one or more symbol data is grouped, and data size information of the symbol group.

The generation time of the virtual report message may be determined based on an expected time when the mobile packet of the RU temporarily stored in the buffer of the ONU is received by the OLT.

The processor may be configured to generate the virtual report message in a report update operation of a current cycle when (i) T_ready representing a time available for transmission to the OLT after a packet corresponding to a symbol group arrives at the ONU is less than or equal to (ii) T_min representing a shortest time until a packet is outputted as the radio scheduling information is received and the grant message is received by the ONU.

The T_ready may be determined by using a base time, a symbol end time offset, and a time taken for a mobile packet output from the RU to be ready for transmission in the ONU.

The T_min may be determined by using a time when a virtual report is able to be generated (T_ref) with respect to the time when the radio scheduling information arrives at the OLT (T_rx), the DBA cycle, the transmission time between the OLT and the ONU, and a processing time of the ONU.

The processor may be configured to determine whether to generate a virtual report message after re-calculating T_ref in a next cycle, when (i) T_ready representing a time available for transmission to the OLT after a packet corresponding to a symbol group arrives at the ONU is greater than (ii) T_min representing a shortest time until a packet is outputted as the radio scheduling information is received and the grant message is received by the ONU.

Additional aspects of example embodiments will be set forth in part in the description which follows and, in part, will be apparent from the description, or may be learned by practice of the disclosure.

According to example embodiments, it is possible to shorten the uplink transmission time through a method of allocating the transmission bandwidth at a high speed by cycle using the radio scheduling information between the CU/DU radio equipment and the OLT.

According to example embodiments, the method is easily implemented in hardware (H/W) because the method is suitable for high-speed operation and its algorithm is simple, and the PON technology may meet the low-latency requirement of the fronthaul through the method, thereby providing a basis for the next-generation PON technology to be applied to ultra-realistic services or fifth generation (5G) backhaul/front network.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
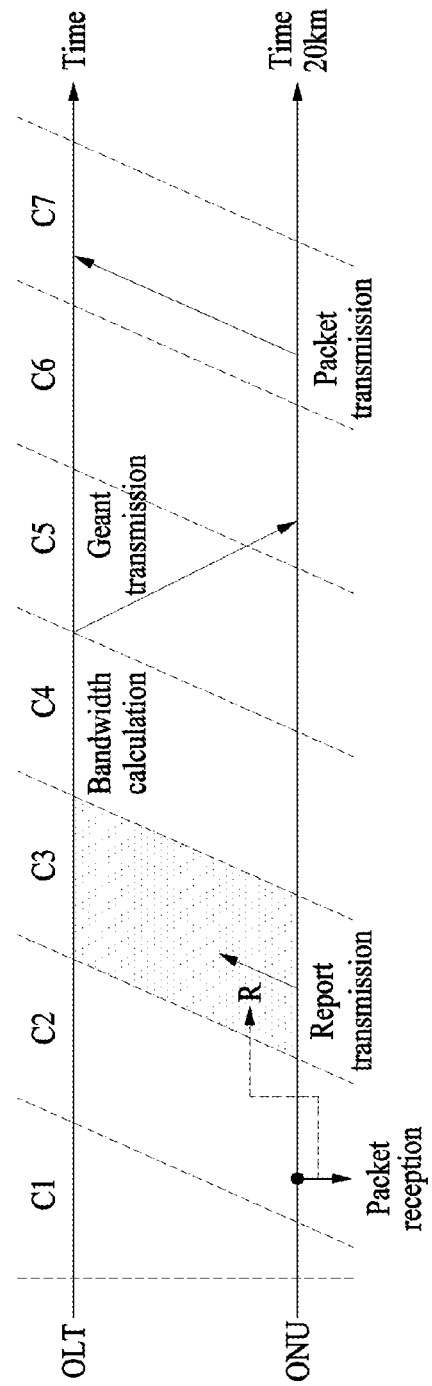
FIG. 1 is a diagram illustrating an example of a cycle-by-cycle DBA scheme according to an example embodiment of the present disclosure.

FIG. 1 is a diagram illustrating an example of a cycle-by-cycle DBA scheme according to an example embodiment of the present disclosure.

In the PON, the allocation of the uplink transmission bandwidth may be performed in the cycle-by-cycle, and the size of the cycle may be fixed or variable. Considering the transmission time from the ONU to the OLT, the cycle dividing line is represented by an oblique line slanted to the right. Each cycle is represented as C1, C2, . . . , Cn.

The ONU may transmit a report message to the OLT in a cycle C3 when a packet arrives in a cycle C2. Then, in a cycle C4, the OLT may use the received report message to calculate the time and allocation amount of the transmission bandwidth to be allocated to each ONU. When the OLT transmits a transmission grant message to the ONU in a cycle C5 and a cycle C6, the ONU may transmit a packet to the OLT in a cycle C7.

If it is assumed that the OLT allocates the transmission bandwidth as much as the amount of reports received in the cycle C3, all packets received in the ONU may be transmitted to the OLT without loss. In this case, if the report message arrives at the OLT in the cycle C3, the packet arrives at the cycle C7, which is exactly 4 cycles later.

As described above, since the time difference between the reception of the report message and the transmission of the packet is constant, if the generation time of the report message is controlled, the time at which the packet is received in the OLT may be controlled. In other words, if it is required for a packet to arrive at the OLT in the cycle C7, the ONU may transmit a report message to the OLT in the cycle C3.

Although the SR-DBA scheme allocates the transmission bandwidth based on the report message received from the ONU, the Co-DBA scheme may allocate the transmission bandwidth using the radio scheduling information received from the CU/DU without receiving the report message from the ONU.

Although the bandwidth allocating apparatus included in the OLT generally has a structure for allocating the transmission bandwidth by receiving the report message, but the present disclosure may provide a virtual report-based Co-DBA scheme that can coexist with the SR-DBA for controlling existing wired subscribers (B2B, B2C) and wireless base stations (fronthaul, backhaul) in a single network.

Figure 2:
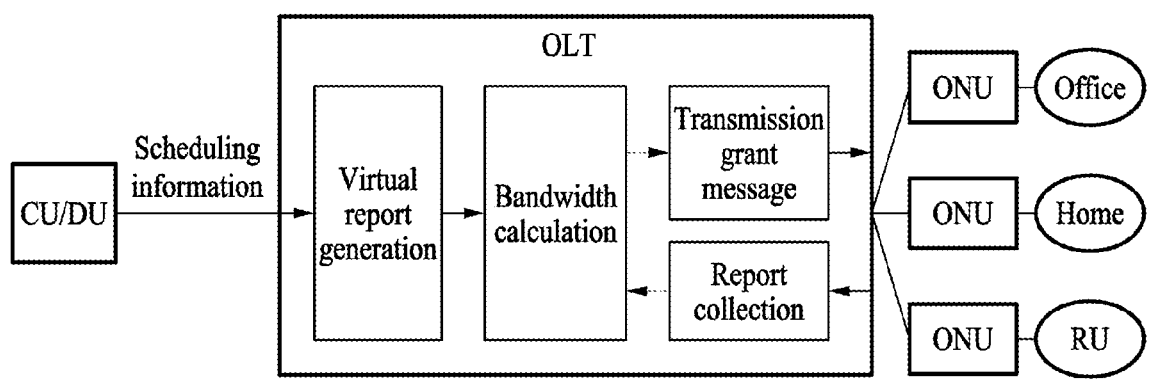
FIG. 2 is a diagram illustrating a structure of a bandwidth allocating apparatus for providing a low-latency fronthaul service in a PON according to an example embodiment of the present disclosure.

FIG. 2 is a diagram illustrating a structure of a bandwidth allocating apparatus for providing a low latency fronthaul service in a PON according to an example embodiment of the present disclosure.

Referring to FIG. 2, the bandwidth allocating apparatus included in the OLT may generate a virtual report message necessary for calculation of the transmission bandwidth using the radio scheduling information received from the CU/DU, and calculate the transmission bandwidth for each ONU based on the report message and the virtual report message received from the ONU.

Thereafter, the OLT bandwidth allocating apparatus may transmit the transmission grant message including information on the calculated transmission bandwidth to each of the ONUs, and each ONU may transmit the packet to the OLT based on the transmission grant message received from the OLT at the time of transmission grant.

Figure 3:
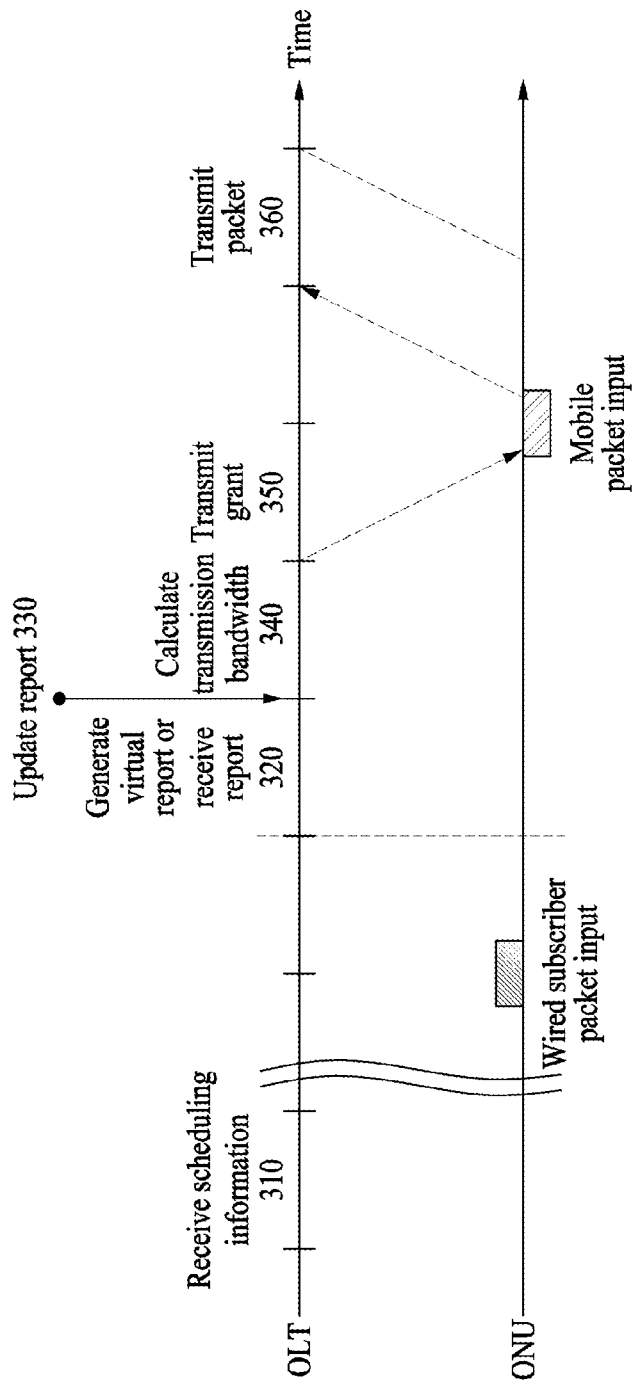
FIG. 3 is a diagram illustrating a bandwidth allocating method performed by a bandwidth allocating apparatus according to an example embodiment of the present disclosure.

FIG. 3 is a diagram illustrating a bandwidth allocating method performed by a bandwidth allocating apparatus according to an example embodiment of the present disclosure.

In operation 310, the OLT bandwidth allocating apparatus may receive the radio scheduling information from the CU/DU. For example, an open radio access network (ORAN) working group sets a CTI standard and exchanges the radio scheduling information with a CTI report message. In this case, the CTI report message may include radio slot information of the RU, and the radio scheduling information may be transmitted to the OLT at least 500 us before the time when the RU transmits the packet.

In operation 320, the bandwidth allocating apparatus of the OLT may directly collect the report message from the ONU (e.g., office, home) for wired subscribers, and in the case of the ONU (e.g., RU) for mobile, the bandwidth allocating apparatus of the OLT may not collect the report message and may generate the virtual report message using the scheduling information received from the CU/DU.

Referring to the example of FIG. 1, when the virtual report message is generated in the cycle C3, a mobile packet received from the RU by the ONU for mobile may be received by the OLT in the cycle C7. Accordingly, the generation time (e.g., cycle) of the virtual report message may be calculated based on the expected time when the mobile packet is received by the OLT, and the detailed calculation method will be described separately.

In operation 330, the OLT bandwidth allocating apparatus may perform report update, which means an act of completing the collection of the report message received from the ONU or the virtual report message generated by itself in every cycle. Such report update may be performed at the start of calculation of the transmission bandwidth for the ONU in every cycle.

Afterwards, in operation 340, the bandwidth allocating apparatus of the OLT may calculate the transmission bandwidth for the ONU based on the amount of reports collected until the report update time. In this case, the calculation of the transmission bandwidth may distinguish the guaranteed bandwidth from the non-guaranteed bandwidth, and first allocate the transmission bandwidth to the ONU that provides a service requiring low latency. Therefore, the allocation of the transmission bandwidth may be guaranteed in the ONU that provides mobile services requiring low latency based on the virtual report message. At this time, for the service requiring low latency, the wireless subscriber may be allocated the transmission bandwidth more than once in the same cycle.

In operation 350, the information on the allocated transmission bandwidth is transmitted to each ONU through the transmission grant message, and in operation 360, each ONU may transmit a packet to the OLT according to the transmission grant timing based on the transmission grant message received from the OLT.

Figure 4:
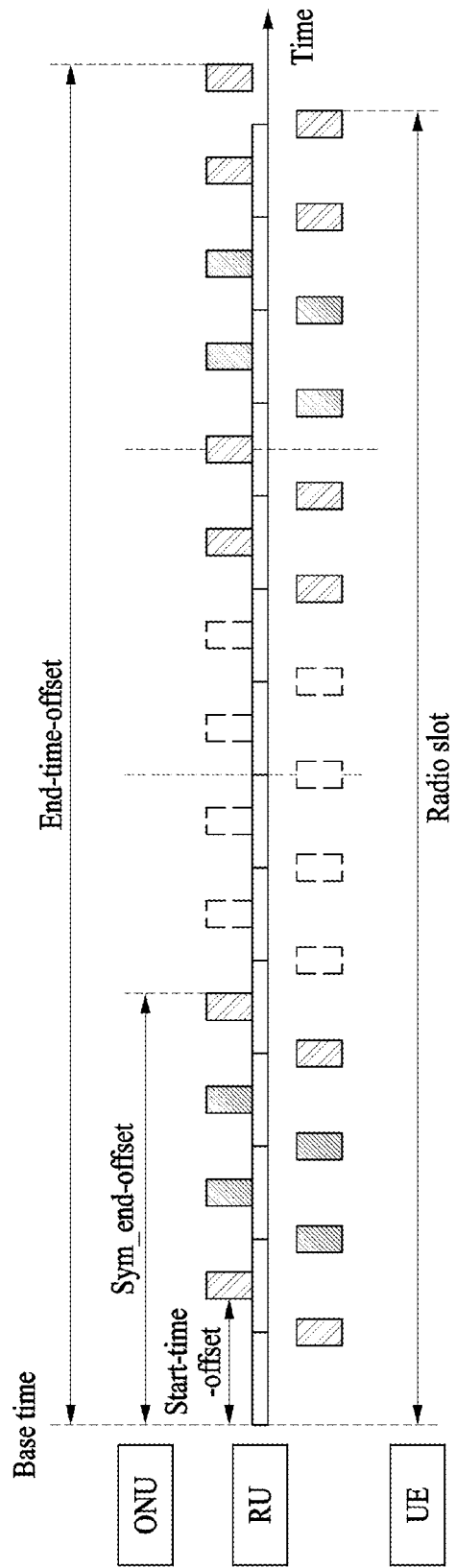
FIG. 4 is a diagram illustrating a transmission symbol and a radio slot of a RU according to an example embodiment of the present disclosure.

FIG. 4 is a diagram illustrating a transmission symbol and a radio slot of an RU according to an example embodiment of the present disclosure.

In the LTE base station, scheduling is performed in units of 1 ms subframe, whereas in the 5G base station, scheduling is performed in units of slots. A slot may be variously defined as 125 us, 250 us, 500 us, 1 ms, or the like.

Referring to FIG. 4, the RU may wirelessly receive data in the units of a symbol from several user equipments (UEs) during a radio slot time through scheduling in the units of a slot. In this case, a period (a dotted line box in FIG. 4) in which there is no symbol to be transmitted may occur according to the fronthaul scheduling format.

The data received in the RU may be transmitted to the DU through a wire in the fronthaul section, and the OLT may use radio scheduling information from the CU/DU for such data transmission.

In this case, the radio scheduling information may include the following information.

1) Base Time

The base time of the radio slot refers to the start time of every radio slot. Based on GPS time, the OLT, the ONU, the CU/DU, and the RU may be time synchronized by a network time synchronization protocol such as IEEE1588.

2) Start Time Offset and End Time Offset

Symbol data received during the radio slot period starts to be output after the start-time-offset time with respect to the base time, and the last symbol is output at the end-time-offset time.

3) Symbol End Time Offset and Symbol Group Size

The symbol data may be output in bursts in units of one or more. In the present disclosure, one or more symbol data output in bursts is referred to as a symbol group. Since multiple symbol groups may be output during each radio slot period, the scheduling information includes a symbol end time offset and data size information of a symbol group for each symbol group as much as the number of symbol groups so that the end time of each symbol group may be known. Therefore, if the output interval and the data size of the symbol group are constant, the interval of the symbol end time offset may be increased constantly.

Figure 5:
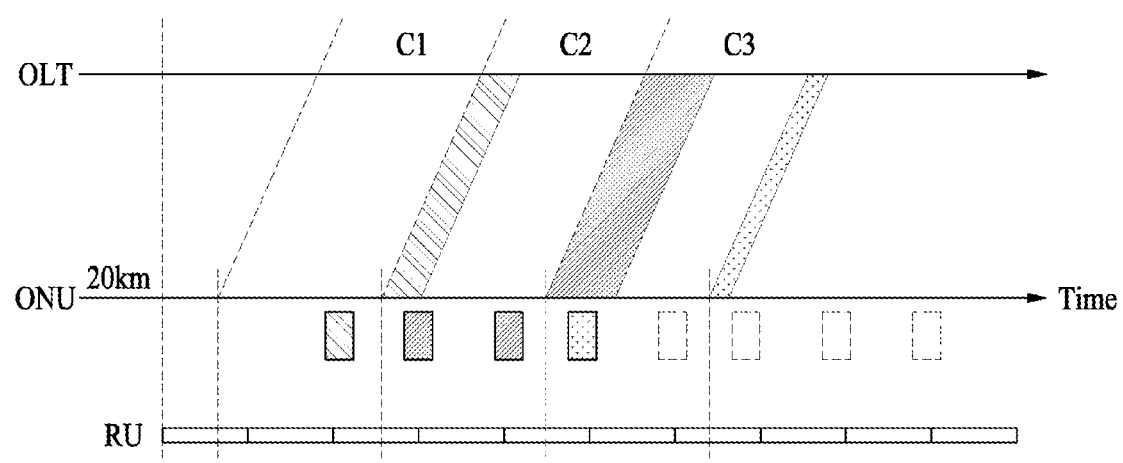
FIG. 5 is a diagram illustrating bandwidth allocating in a Co-DBA scheme according to an example embodiment of the present disclosure.

FIG. 5 is a diagram illustrating bandwidth allocation in a Co-DBA scheme according to an example embodiment of the present disclosure.

In the bandwidth allocating method of the present disclosure, in principle, a packet input to the ONU in a certain cycle is output to the OLT in the next cycle. Referring to FIG. 5, all symbol groups input to ONU up to the cycle C1 may be output to the OLT in the cycle C2, and all symbol groups input to the ONU in the cycle C2 may be output to the OLT in the cycle C3.

Therefore, even if a packet is simultaneously input from several RUs, the packet may be certainly output after one cycle, and as the transmission grant interval of the ONU is shortened, the buffering time of the ONU is reduced and the latency may be shortened.

For example, if the DBA cycle is 125 us and the transmission grant interval for the same ONU is 62.5 us, two transmission grants may be performed on the same ONU during one DBA cycle. Therefore, each cycle period of C1 to C3 in FIG. 5 may be 62.5 us, which is the transmission grant interval for the same ONU.

Figure 6:
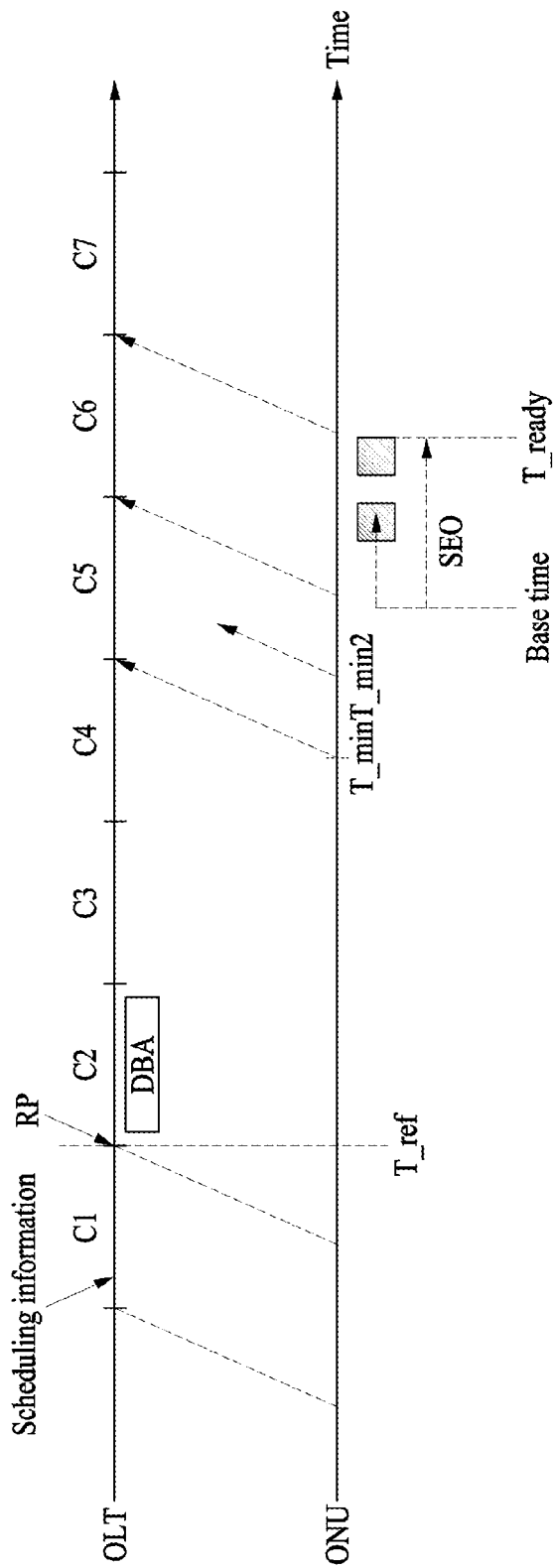
FIG. 6 is a diagram illustrating a method of generating a virtual report based on radio scheduling information according to an example embodiment of the present disclosure.

FIG. 6 is a diagram illustrating a method of generating a virtual report based on radio scheduling information according to an example embodiment of the present disclosure.

In the bandwidth allocating method of the present disclosure, it may be important to calculate the generation time of the virtual report at high speed in order to allocate the transmission bandwidth according to the time when the packet is input to the ONU. Referring to FIG. 6, a RP may represent a report update point, a SEO may represent a symbol end time offset (sym-end-offset), and dba-cycle may represent a calculation cycle of the DBA.

The generation time of the virtual report may be the starting time of every dba_cycle. It is assumed that the radio scheduling information is received at least 500 us before data is received in the ONU.

Based on the time (T_rx) at which the radio scheduling information arrives at the OLT, a time point (T_ref) at which the virtual report is able to be generated may be defined as in Equation 1 below. T_fef is the start time of each cycle.

$$T_{ref} = \text{ceil}(T_{rx}/dba\text{cycle}) \times dba\text{cycle} \qquad \text{<Equation 1>}$$

T_min may be the shortest time until a packet temporarily stored in the buffer of the ONU is output as the radio scheduling information is received and the transmission grant message is transmitted to the ONU, and may be defined as in Equation 2 below.

$$T\_min = T\_ref + dba\_cycle + \max \text{ fiber\_delay} + onu\_\text{processing time} \qquad \text{<Equation 2>}$$

For example, in Equation 2, when dbacycle=125 us, max fiberdelay(20 km)=100 us, and onuprocessingtime=35 us, Tmin=Tref+260 us. Since the ONU may transmit a packet 260 us after receiving the radio scheduling information, the radio scheduling information must be received before at least 3 dba cycles (125 us×3). If the bandwidth 2 is allocated during dba_cycle, the second T_min, T_min2, may be defined as in Equation 3 below.

$$T\_min2 = T\_min + dba\_cycle/2 \qquad \text{<Equation 3>}$$

T_ready may be the time that a symbol group packet arrives in the ONU and is able to be transmitted to the OLT, and may be defined as in Equation 4 below.

$$T\_ready = \text{base time} + \text{SEO(symbol end time offset)} + Ti \qquad \text{<Equation 4>}$$

At this time, Ti is the time required until the packet output from the RU is ready for transmission in the ONU.

1) When Allocating a Bandwidth Once Per the DBA Cycle

If T_ready≤T_min, the OLT bandwidth allocating apparatus may generate the virtual report in the RP operation of the current cycle. Otherwise, the OLT bandwidth allocating apparatus may wait until the next cycle and then re-calculate T_ref in the next cycle and determine whether to generate the virtual report.

2) When the Bandwidth is Allocated Twice Per the DBA Cycle

First Half Cycle

If T_ready≤T_min, the OLT bandwidth allocating apparatus may generate the virtual report in the RP operation of the current cycle. Otherwise, the bandwidth allocating apparatus of the OLT may wait until the next cycle and then re-calculate T_min in the next cycle and determine whether to generate the virtual report.

Second Half Cycle

If T_ready≤T_min2, the OLT bandwidth allocating apparatus may generate the virtual report in the RP operation of the current cycle. Otherwise, the bandwidth allocating apparatus of the OLT may wait until the next cycle, and then re-calculate T_min2 in the next cycle, and determine whether to generate the virtual report.

By applying the same method of calculating the generation time of the virtual report as described above, the number of bandwidth allocations per the DBA cycle may be increased, so that the latency may be reduced.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A bandwidth allocating method performed by a bandwidth allocating apparatus included in an optical line terminal (OLT), the bandwidth allocating method comprising:
    receiving an actual report message requesting bandwidth allocation from at least one optical network unit (ONU) for wired subscribers connected to the OLT;
    receiving radio scheduling information for at least one ONU for mobile connected to the OLT from a central unit (CU)/digital unit (DU);
    generating a virtual report message using the radio scheduling information received from the CU/DU;
    allocating a transmission bandwidth for the at least one ONU for the wired subscribers and the at least one ONU for the mobile through the received actual report message and the generated virtual report message; and
    transmitting the allocated transmission bandwidth to the at least one ONU for the wired subscribers and the at least one ONU for the mobile using a grant message,
    wherein the generating of the virtual report message comprises, when (i) T_ready representing a time available for transmission to the OLT after a packet corresponding to a symbol group arrives at the ONU is less than or equal to (ii) T_min representing a shortest time until a packet is outputted as the radio scheduling information is received and the grant message is received by the ONU, generating the virtual report message in a report update operation of a current cycle.

2. The bandwidth allocating method of claim 1, wherein the radio scheduling information is received through a cooperative transport interface (CTI) report message including radio slot information of a remote unit (RU).

3. The bandwidth allocating method of claim 2, wherein the radio scheduling information comprises at least one information of a base time representing a start time of a radio slot, a start time offset at which symbol data is started to be output based on the base time during a radio slot period, an end-time-offset at which a last symbol data is output during the radio slot period, a symbol end-time offset for knowing an end time of a symbol group in which at least one or more symbol data is grouped, and data size information of the symbol group.

4. The bandwidth allocating method of claim 1, wherein a generation time of the virtual report message is determined based on an expected time when a mobile packet of an RU temporarily stored in a buffer of the ONU is received by the OLT.

5. The bandwidth allocating method of claim 1, wherein the T_ready is determined by using a base time, a symbol end time offset, and a time taken for a mobile packet output from an RU to be ready for transmission in the ONU.

6. The bandwidth allocating method of claim 1, wherein the T_min is determined by using a time when a virtual report is able to be generated (T_ref) with respect to a time when the radio scheduling information arrives at the OLT (T_rx), a dynamic bandwidth allocation (DBA) cycle, a transmission time between the OLT and the ONU, and a processing time of the ONU.

7. The bandwidth allocating method of claim 1, wherein the generating of the virtual report message comprises, when (i) T_ready representing a time available for transmission to the OLT after a packet corresponding to a symbol group arrives at the ONU is greater than (ii) T_min representing a shortest time until a packet is outputted as the radio scheduling information is received and the grant message is received to the ONU, determining whether to generate a virtual report message after re-calculating T_ref in a next cycle.

8. A bandwidth allocating apparatus included in an optical line terminal (OLT), the bandwidth allocating apparatus comprising:
a processor,
wherein the processor is configured to:
receive an actual report message requesting bandwidth allocation from at least one optical network unit (ONU) for wired subscribers connected to the OLT;
receive radio scheduling information for at least one ONU for mobile connected to the OLT from a central unit (CU)/digital unit (DU));
generate a virtual report message using the radio scheduling information received from the CU/DU;
allocate a transmission bandwidth for the at least one ONU for the wired subscribers and the at least one ONU for the mobile through the received actual report message and the generated virtual report message; and
transmit the allocated transmission bandwidth to the at least one ONU for the wired subscribers and the at least one ONU for the mobile using a grant message,
wherein the processor is configured to generate the virtual report message in a report update operation of a current cycle when T_ready representing a time available for transmission to the OLT after a packet corresponding to a symbol group arrives at the ONU is less than or equal to T_min representing a shortest time until a packet is outputted as the radio scheduling information is received and the grant message is received to the ONU.

9. The bandwidth allocating apparatus of claim 8, wherein the radio scheduling information is received through a cooperative transport interface (CTI) report message including radio slot information of a remote unit (RU).

10. The bandwidth allocating apparatus of claim 9, wherein the radio scheduling information comprises at least one information of a base time representing a start time of a radio slot, a start time offset at which symbol data is started to be output based on the base time during a radio slot period, an end-time-offset at which a last symbol data is output during the radio slot period, a symbol end-time offset for knowing an end time of a symbol group in which at least one or more symbol data is grouped, and data size information of the symbol group.

11. The bandwidth allocating apparatus of claim 8, wherein a generation time of the virtual report message is determined based on an expected time when a mobile packet of an RU temporarily stored in a buffer of the OW is received by the OLT.

12. The bandwidth allocating apparatus of claim 8, wherein the T_ready is determined by using a base time, a symbol end time offset, and a time taken for a mobile packet output from an RU to be ready for transmission in the ONU.

13. The bandwidth allocating apparatus of claim 8, wherein the T_min is determined by using a time when a virtual report is able to be generated (T_ref) with respect to a time when the radio scheduling information arrives at the OLT (T_rx), a dynamic bandwidth allocation (DBA) cycle, a transmission time between the OLT and the ONU, and a processing time of the ONU.

14. A bandwidth allocating apparatus included in an optical line terminal (OLT), the bandwidth allocating apparatus comprising:
a processor,
wherein the processor is configured to:
receive an actual report message requesting bandwidth allocation from at least one optical network unit (ONU) for wired subscribers connected to the OLT;
receive radio scheduling information for at least one ONU for mobile connected to the OLT from a central unit (CU)/digital unit (DU));
generate a virtual report message using the radio scheduling information received from the CU/DU;
allocate a transmission bandwidth for the at least one ONU for the wired subscribers and the at least one ONU for the mobile through the received actual report message and the generated virtual report message; and
transmit the allocated transmission bandwidth to the at least one OW for the wired subscribers and the at least one ONU for the mobile using a grant message,
wherein the processor is configured to determine whether to generate a virtual report message after re-calculating T_ref in a next cycle, when (i) T_ready representing a time available for transmission to the OLT after a packet corresponding to a symbol group arrives at the ONU is greater than (ii) T_min representing a shortest time until a packet is outputted as the radio scheduling information is received and the grant message is received to the ONU.

* * * * *